United States Patent [19]

Akeel et al.

[11] 4,342,536
[45] Aug. 3, 1982

[54] DOOR-OPENER APPARATUS

[75] Inventors: Hadi K. A. Akeel, Sterling Heights; Donald S. Bartlett, Troy; Theodore J. Beaulieu, Warren; Mitchell Choly, Troy, all of Mich.

[73] Assignee: General Motors Corporation, Detroit, Mich.

[21] Appl. No.: 178,380

[22] Filed: Aug. 14, 1980

[51] Int. Cl.³ .............................................. B25J 5/02
[52] U.S. Cl. ............................................... 414/744 A
[58] Field of Search ............... 414/1, 4, 7, 373, 684.3, 414/744 R, 744 A, 917; 74/469, 519, 521, 582

[56] References Cited

U.S. PATENT DOCUMENTS 3,160,290 12/1964 Wilson ................................ 414/4 X
3,703,968 11/1972 Uhrich et al. .................... 414/917 X
3,995,746 12/1976 Usagida ........................... 414/917 X
3,995,756 12/1976 Hjelm ............................... 414/917 X

FOREIGN PATENT DOCUMENTS 623732 7/1978 U.S.S.R. ............................. 414/917
697316 11/1979 U.S.S.R. ............................. 414/917

Primary Examiner—Johnny D. Cherry
Attorney, Agent, or Firm—Edward J. Biskup

[57] ABSTRACT

An apparatus for opening and closing a vehicle door as a vehicle body is being conveyed through a paint booth and having a primary arm pivotally mounted on a carriage and supporting a secondary arm for seizing and releasing the vehicle door under the control of a link, the apparatus being characterized in that the pivotal connections interconnecting the primary arm and the link to the secondary arm and to the carriage are located in positions which allow the primary and secondary arms to be positioned in substantially parallel relationship adjacent the carriage when the apparatus assumes a stored position.

2 Claims, 7 Drawing Figures

DOOR-OPENER APPARATUS

This invention, in general, concerns an apparatus for moving an article between preset positions and, more particularly, an apparatus which serves to open and close the door of a vehicle while the latter is conveyed through a paint booth.

More specifically, the present invention contemplates an apparatus having an article gripper which is power-operated for seizing and releasing the door of a vehicle as the vehicle is transported along a path past the apparatus. In the preferred form of the invention, the apparatus is located in the work area of a paint booth and includes a carriage that is movable in either direction along a rail located adjacent to and parallel to a track along which the vehicle is conveyed. The carriage supports one end of a primary arm for pivotal movement about a first vertically orientated pivot axis, and the other end of the primary arm, in turn, supports an intermediate portion of a secondary arm for pivotal movement about a second vertically orientated pivot axis. The carriage also supports one end of a control link for pivotal movement about a third vertically orientated pivot axis which is spaced from the first pivot axis. The other end of the control link is pivotally connected to the secondary arm adjacent the second pivot axis for movement about a fourth vertically orientated pivot axis. The article gripper is mounted to the free end of the secondary arm and, upon command, is adapted to seize or release a rod attached to the hinged door of the vehicle. A motor is connected to the primary arm for moving the latter about the first pivot axis so as to cause the article gripper to move toward or away from the carriage along a programmed path for opening and closing the hinged door. The control link maintains a preset length during the opening and closing movements of the door for controlling such movement. However, if desired, the control link can be designed to collapse when a predetermined force is applied to the control link along its longitudinal axis, causing the length of the control link to shorten, followed by actuation of an associated switch for providing a signal indicating that the article gripper has seized the hinged door. In addition, the relative lengths of the primary and secondary arms and of the control link, as well as the location of the pivotal connections interconnecting these elements with the carriage and with each other, is such that when the apparatus is placed in the stored position the primary and secondary arms are positioned in substantially parallel relationship to provide a compact unit which allows maximum room or space in the work area of the paint booth for maintenance purposes.

The objects of the present invention are: to provide a new and improved door-opener apparatus which works in conjunction with an automatic spray device for painting the inside of a vehicle door; to provide a new and improved apparatus for automatically opening and closing a vehicle door as the sheet metal vehicle body is being conveyed through a paint booth; to provide a new and improved apparatus for opening and closing a door of a moving vehicle and that is characterized in that the apparatus has an article gripper pivotally supported on a movable carriage for seizing and releasing the door and also includes a pair of links that are substantially parallel to the path of travel of the vehicle when the apparatus is in the stored position; and to provide a new and improved apparatus having a primary arm pivotally mounted on a carriage and which includes a secondary arm pivotally connected to the primary arm for seizing and releasing an article under the control of a link that maintains a fixed length while the secondary arm moves the article and is located in substantially parallel relationship with the primary and secondary arms when the apparatus assumes a stored position.

Other objects and advantages of the present invention can be derived from the following detailed description when taken in conjunction with the accompanying drawings, in which.

Figure 1:
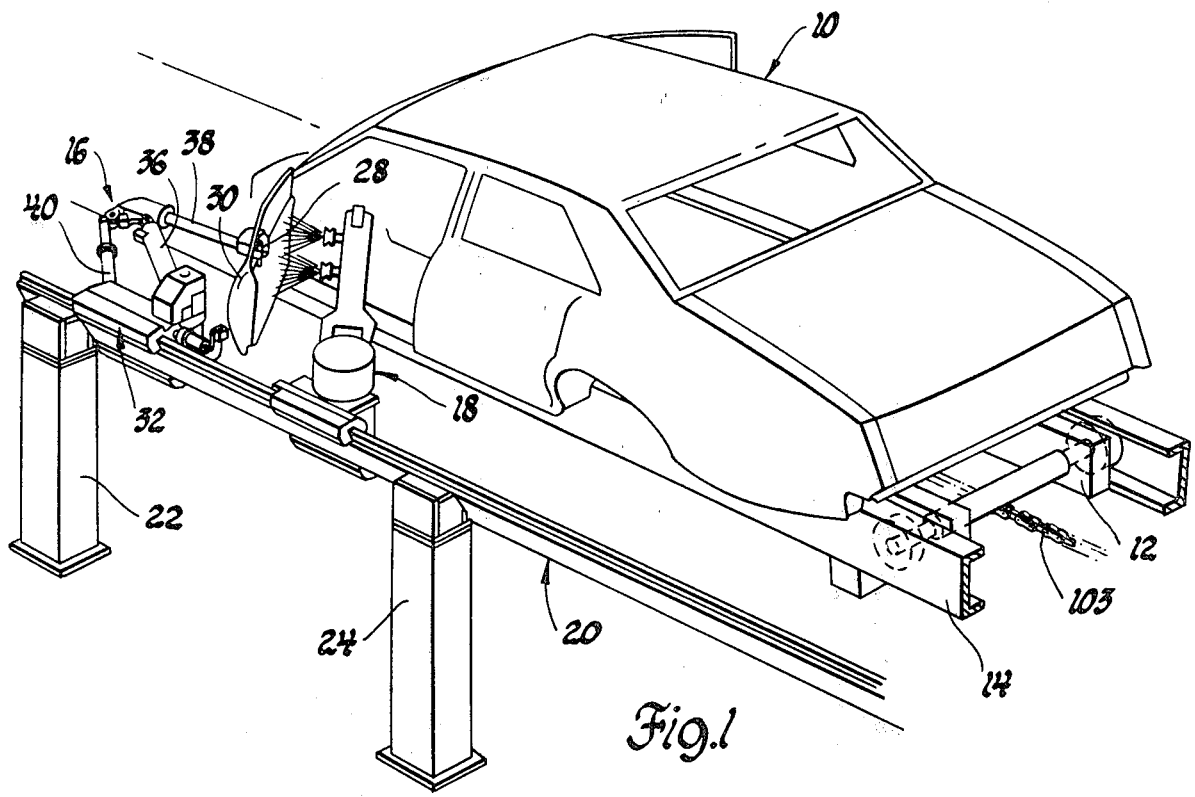
FIG. 1 is a perspective view showing a sheet metal vehicle body being conveyed past a door-opener apparatus made in accordance with the present invention.
Figure 2:
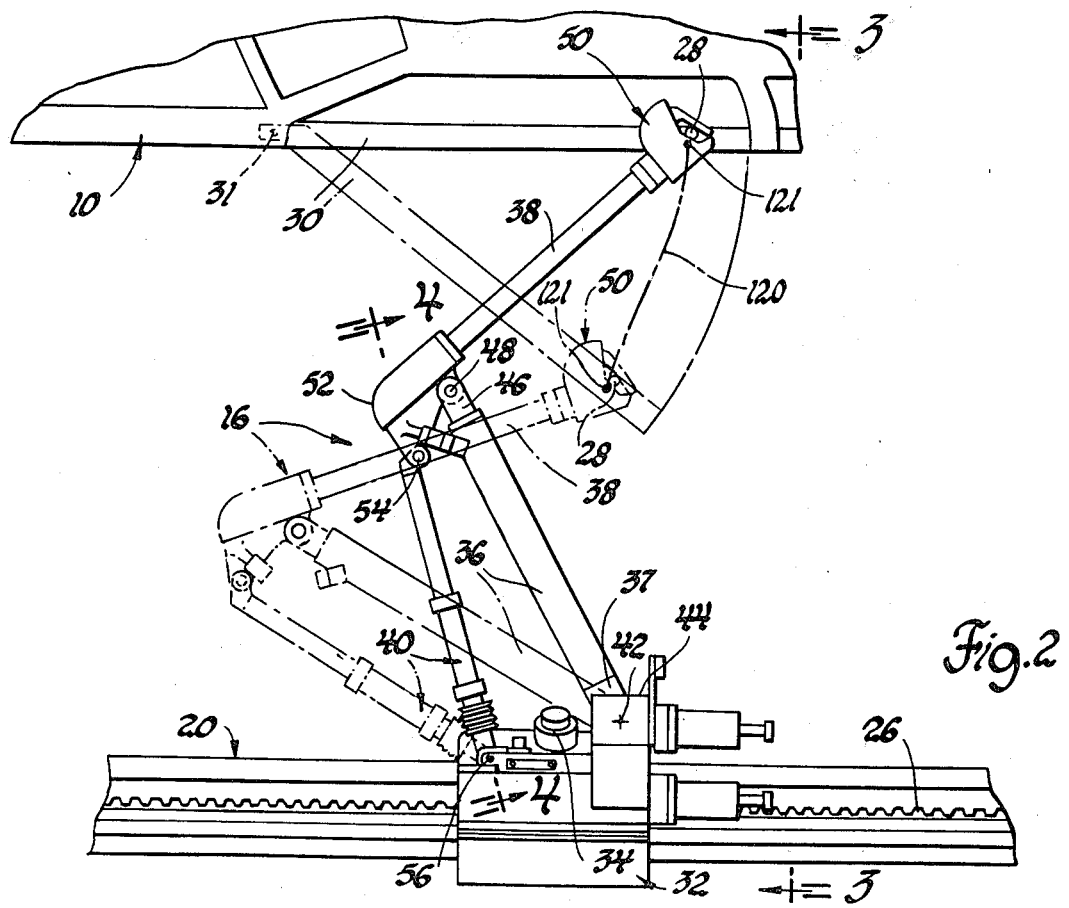
FIG. 2 is a plan view showing the door-opener apparatus of FIG. 1 in the door-closed position and the door-opened position.
Figure 3:
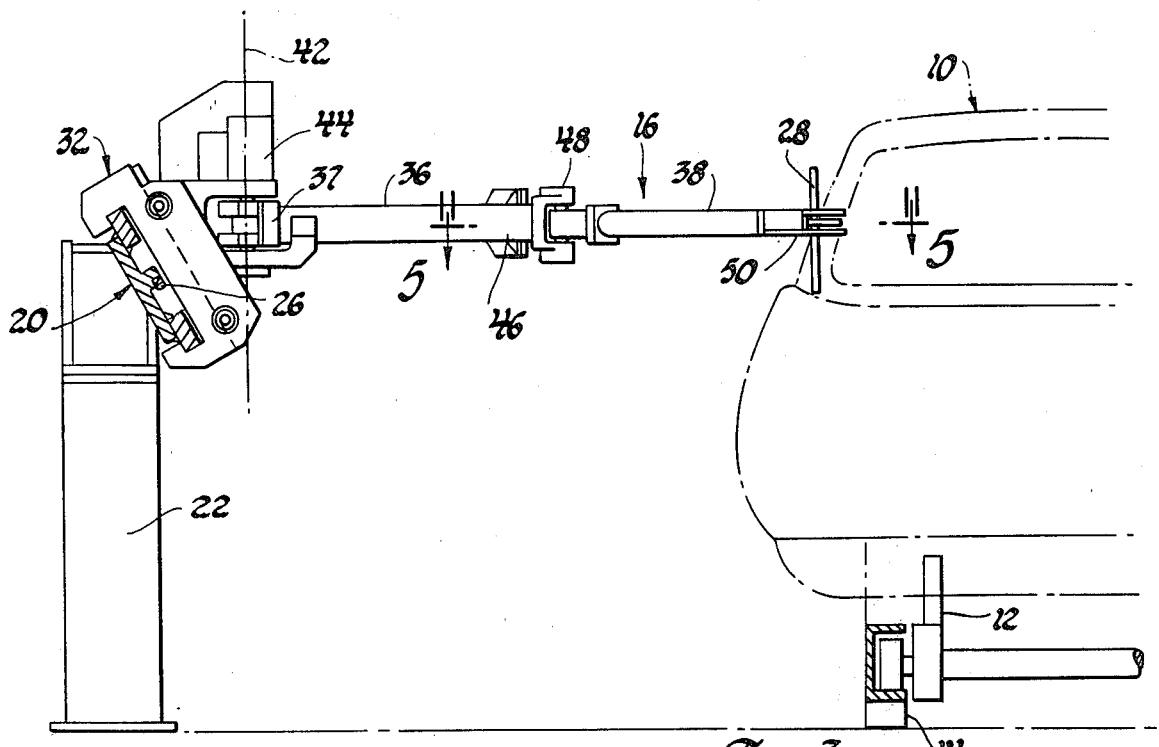
FIG. 3 is a sectional view taken on line 3—3 of FIG. 2.

Referring to the drawings and, more particularly, to FIG. 1 thereof, a vehicle body 10 made of sheet metal is shown mounted on a carrier 12 and being conveyed along a track 14 through a conventional paint booth which, in this case, houses a door-opener apparatus 16 made in accordance with the present invention and that works in conjunction with a paint robot 18. Both the door-opener apparatus 16 and the paint robot 18 are supported on a horizontal guide rail 20 for movement in either direction along a path that is parallel to the path of travel of the vehicle body 10. The guide rail 20 is mounted on spaced stanchions, two of which are shown in FIG. 1 and identified by the reference numerals 22 and 24. In addition, and as seen in FIG. 2, the guide rail 20 is formed with a rack 26 that is engaged by appropriate toothed gearing (not shown) which forms a part of both the door-opener apparatus 16 and the paint robot 18 for causing driving movement of each of these devices along the guide rail 20. As seen in FIG. 1, the door-opener apparatus 16 is adapted to seize a vertical door rod 28, which is part of a fixture removably mounted to the inner panel of a vehicle door 30, and to cause the door 30 to be moved about its hinged connection 31 to a door-opened position so that the inside of the door 30 can be painted by the paint robot 18 during the painting operation of the vehicle body 10. Thereafter, and as will be more fully explained in the description of the operation, the door 30 is closed by the door-opener apparatus 16 and the door rod 28 is released, after which the door-opener apparatus 16 returns to a "ready" position, awaiting the arrival of another vehicle body for repeating the door opening and closing operation. It will be noted that both the door-opener apparatus 16 and the paint robot 18 are intended to be program-controlled so that their movements and positions can be coordinated during the painting operation.

Referring now to FIGS. 1 through 5, the door-opener apparatus 16 constructed in accordance with the present invention comprises a carriage 32 which is supported for sliding movement along the guide rail 20. The carriage 32 houses the aforementioned toothed gearing which meshes with the teeth of rack 26. A rotary hydraulic motor 34, mounted on the carriage 32, serves to drive the toothed gearing and thereby causes the carriage 32 to move in either direction along the guide rail 20. The door-opener apparatus 16 also includes a primary arm 36, a secondary arm 38, and a control link 40—all of which are connected to and supported by the carriage 32. In this regard, it will be noted that the primary arm 36 has its inner end 37 supported by the carriage 32 for rotary movement about a pivotal connection 42 having a vertical axis and is driven about the pivotal connection 42 by a hydraulic vane motor 44. The outer end 46 of the primary arm 36 is connected by a pivotal connection 48 to an intermediate portion of the secondary arm 38, one end of which is formed with a gripper 50. The other end 52 of the secondary arm 38 is connected by a pivotal connection 54 to one end of the control link 40. The other end of the control link 40 is connected to the carriage 32 by a pivotal connection 56 which is spaced from the pivotal connection 42.

Figure 4:
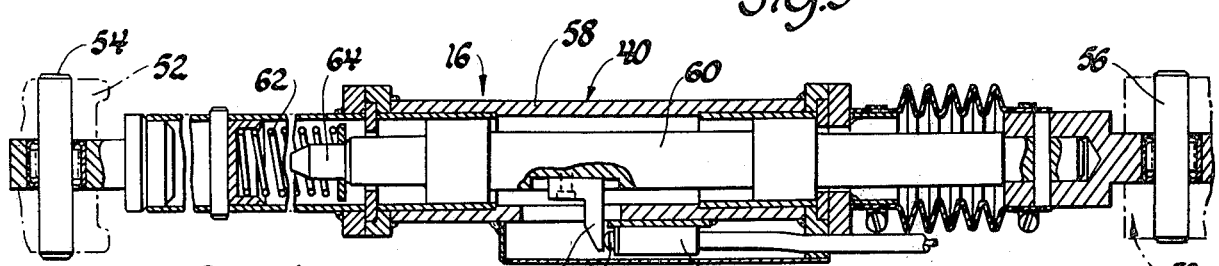
FIG. 4 is an enlarged longitudinal sectional view taken on the line 4—4 of FIG. 2.

Both the primary arm 36 and the secondary arm 38 are formed as rigid members of predetermined lengths. The control link 40 can also be a rigid member of a predetermined length, but in this case is a contractible member that comprises a cylindrical member 58 and a double-headed piston member 60 which can move relative to each other in an axial direction. In this regard and as best seen in FIG. 4, the cylindrical member 58 and piston member 60 are normally held in fixed positions relative to each other by a coil spring 62 housed in one end of the cylindrical member 58. The spring 62 engages the pointed inner end 64 of the piston member 60 and exerts a predetermined degree of biasing force therein so that the cylindrical member 58 and piston member 60 normally maintain the relative positions of FIG. 4. Under certain conditions to be explained, the biasing force of the spring 62 can be overcome so as to cause the control link 40 to shorten in length. When this occurs, a dog 66, rigidly connected to the piston member 60, moves away from a button 68 which is part of a switch 70 fixed with the cylindrical member 58, so as to cause the contacts (not shown) of the switch 70 to be closed and thereby generate a signal which indicates that the door-opener apparatus 16 has in fact opened the vehicle door 30. This signal then allows the paint robot 18 to move in and paint the inside of the vehicle door 30.

Figure 5:
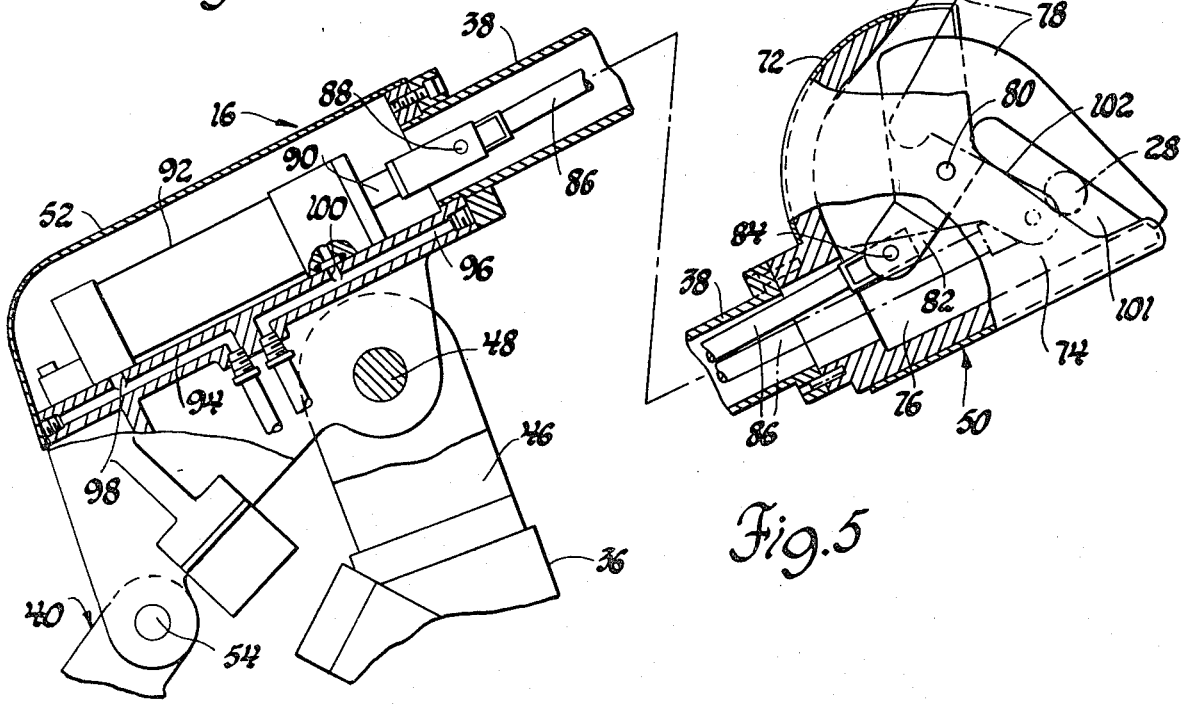
FIG. 5 is an enlarged sectional view taken on line 5—5 of FIG. 3.

The gripper 50, which forms a part of the secondary arm 38, can best be seen in FIG. 5 and comprises a generally round housing 72 which includes a pair of side walls 74 and 76. A jaw 78 is supported in the housing 72 for rotation about a shaft 80, the opposite ends of which are fixed to the side walls 74 and 76. The jaw 78 is formed with a tab 82 which is connected by a pivotal connection 84 to one end of a link 86 which extends rearwardly and is connected by a pivotal connection 88 with the piston rod 90 of an air cylinder 92. The air cylinder 92 is adapted to receive pressurized air from any suitable source (not shown) that can flow through passages 94 and 96 which respectively lead to ports 98 and 100 formed at opposite ends of the air cylinder 92. Thus, when pressurized air is directed through passages 94 and 96 to the port 98 while venting port 100, the piston rod 90 will move to the right causing the link 86 to rotate the jaw 78 from the full-line closed position to the phantom line opened position shown in FIG. 5. It will be noted that when the jaw 78 is in the full-line position shown in FIG. 5 it cooperates with the housing 72 for seizing and maintaining the door rod 28 in a fixed position within a slot 101 that is defined by the space between the jaw 78 and the outer edges 102 of the housing side walls 74 and 76. When the jaw 78 moves to the phantom line position, the door rod 28, of course, is released.

Figure 6:
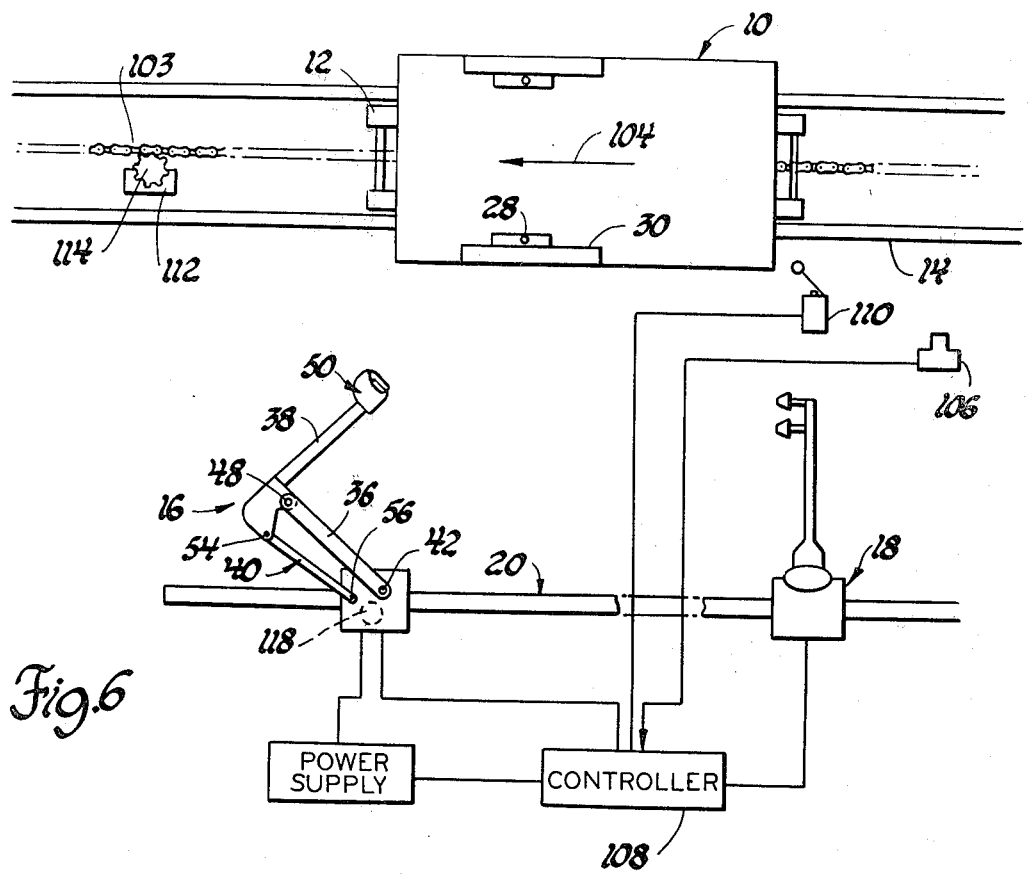
FIG. 6 is a schematic diagram showing the door-opener apparatus combined with the control components.

The operation of the door-opener apparatus 16 described above is as follows. As seen in FIGS. 1 and 6, a traveling conveyor chain 103 is fastened to the carrier 12 and causes the latter to move in the direction of the arrow 104 into the paint booth. The sheet metal vehicle body 10, mounted on the carrier 12, arrives with the vehicle door 30 closed and with the door rod 28 fastened to the inner panel of the vehicle door 30. As the sheet metal vehicle body 10 enters the work station wherein the door-opener apparatus 16 and the paint robot 18 are located, it passes a model-recognition detector 106 which sends a signal to a controller 108. The moving vehicle body 10 then trips a limit switch 110 which tells the controller 108 to start reading the counts from a conveyor resolver 112 which is attached to the chain 103 through a sprocket 114. When a signal is sent to the controller 108 from the paint robot 18 to begin operation, the controller 108 then commands the hydraulic motor 34 to synchronize the position of the carriage 32 on the guide rail 20 by counting the pulses of a resolver 118, associated with the toothed gearing in the carriage 32 which meshes with the rack 26, and comparing such pulses to the position of rod 28 attached to vehicle door 30, as indicated by the conveyor resolver 112. When carriage 32 is properly positioned relative to door rod 28, controller 108 commands hydraulic motor 34 to maintain such relative position, and commands hydraulic vane motor 44 to rotate in a clockwise direction, moving the primary arm 36 to the extended position, as shown in full lines in FIG. 2. After the primary arm 36 is thus extended, the controller 108 then causes the air cylinder 92 to extend, which then closes the jaw 78 of the gripper 50 on the door rod 28. The controller 108 then causes the hydraulic vane motor 44 to rotate the primary arm 36 in a counterclockwise direction about the pivotal connection 42. At the same time, the movement of the carriage 32 along the guide rail 20 is coordinated with the travelling movement of the vehicle body 10, permitting the vehicle door 30 to be moved to the door-opened position shown in phantom lines in FIG. 2. Once the vehicle door 30 is moved to the opened position shown in FIG. 2, the controller 108 then causes the carriage 32 to move a short distance in an opposite direction. At such time if the gripper 50 has in fact seized the door rod 28 and fully opened the vehicle door 30, then the reverse movement of the carriage 32 causes contraction of the control link 40 so as to cause the switch 70 associated therewith to be actuated and to signal the controller 108 that the vehicle door 30 has in fact been opened. The contraction of the control link 40 occurs, of course, in response to the angular movement of the vehicle door 30 about its hinged connection 31. The controller 108 then causes the paint robot 18 to move into position and paint the inside of the vehicle door 30. On the other hand, if the gripper 50 of the door-opener apparatus 16 has not seized the door rod 28, then the movement of the carriage 32 in the opposite direction causes the gripper 50 to move parallel to the guide rail 20 along a straight path. The latter movement does not cause the control link 40 to contract and, consequently, the contacts of the switch 70 are not closed and the controller 108 does not activate the paint robot 18. Thus it can be seen that the movement of the door-opener apparatus 16 in a direction opposite to that of normal travel provides for automatically determining whether or not the gripper 50 has seized the door rod 28.

After the inside of the vehicle door 30 has been painted, the paint robot 18 moves away from the vehicle door 30 and a signal is then given to the door-opener apparatus 16 to close the vehicle door 30. During such time the gripper 50 moves the door rod 28 and, accordingly, the vehicle door 30, from the door-opened position shown in phantom lines in FIG. 2 to the door-closed position shown in full lines, returning the vehicle door 30 to the closed position. The gripper 50 then releases the door rod 28 and returns to the "ready" position, awaiting arrival of another sheet metal vehicle body which is to be painted.

Figure 7:
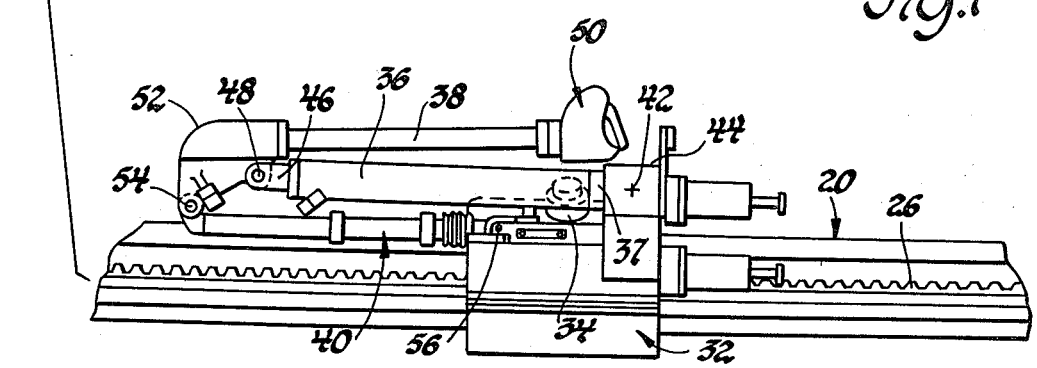
FIG. 7 is a view similar to the view in FIG. 2, but shows the door-opener apparatus in the stored position.

FIG. 7 shows the door-opener apparatus 16 in the stored position when not in use. It will be noted that in this position the longitudinal center axis of each of the primary arm 36, the secondary arm 38, and the control link 40, is located substantially parallel to each other so as to provide a compact configuration close to the carriage 32. Thus, maximum space is available in the work area adjacent the paint robot 18 and the door-opener apparatus 16, permitting ease of access to and ample working space therein for maintenance personnel.

In addition, it will be noted that a door-opener apparatus 16, as described above, has been constructed and successfully tested and had a primary arm 36 in which the distance between the centers of the pivotal connections 42 and 48 measured 1000 mm. The distance between the centers of the pivotal connections 54 and 56 of the control link 40 measured 813 mm, and the distance between the centers of the pivotal connections 48 and 54 and between the centers of the pivotal connections 42 and 56 was 184 mm and 369 mm, respectively. The offset distance between the centers of pivotal connections 42 and 56—measured along a line perpendicular to a pair of lines passing respectively through the center of pivotal connection 42 and the center of pivotal connection 56 and parallel to each other and to the rack 26, was 84 mm. The arrangement of the centers of the pivotal connections 42, 48, 54, and 56 was such that a straight line passing through the centers of pivotal connections 42 and 56 intersects a straight line passing through the centers of pivotal connections 48 and 54 at a point located to one side of the rack 26 opposite the work area when the door-opener apparatus 16 is in the full and phantom line positions shown in FIG. 2, and when it is in the stored position shown in FIG. 7. Also, the arrangement of the centers of the pivotal connections 42, 48, 54, and 56 and the relative lengths of primary arm 36, secondary arm 38, and control link 40 were such that as the vehicle door 30 is moved from the full line to the phantom line position, a point 121 on gripper 50 adjacent the door rod 28 follows a path 120 (as seen in FIG. 2) that is substantially linear and substantially perpendicular to a line bisecting the angle included by the door position in the open and closed states.

Various changes and modifications can be made in this apparatus without departing from the spirit of the invention. Such changes and modifications are contemplated by the inventors, and they do not wish to be limited except by the scope of the appended claims.

The embodiments of the invention for which an exclusive property or privilege is claimed are defined as follows:

1. An apparatus for seizing and releasing a hinged member of a vehicle body and adapted to move from a first position wherein said apparatus seizes said hinged member while in a closed position to a second position wherein said apparatus holds said hinged member in an opened position while said vehicle body is transported along a path past said apparatus, said apparatus adapted to assume a stored position and comprising a carriage movable in either direction along a track located adjacent to said path; a primary arm having one end thereof mounted on said carriage for pivotal movement about a first pivot axis; a secondary arm mounted on the other end of said primary arm for pivotal movement about a second pivot axis; a link having one end thereof pivotally connected to said carriage at a point spaced from said first pivot axis for pivotal movement about a third pivot axis, the other end of said link being connected to a portion of said secondary arm adjacent to said second pivot axis for pivotal movement about a fourth pivot axis; an article gripper mounted at the free end of said secondary arm; means carried by said secondary arm for selectively operating said article gripper for causing said article gripper to seize or release said hinged member of said vehicle body; a motor connected to said primary arm for moving said primary arm and said secondary arm under the control of said link about said first pivot axis to said first position, said second position and said stored position, the arrangement of said first, second, third, and fourth pivot axes being such that the distance between said first pivot axis and said third pivot axis is substantially twice the distance between said second pivot axis and said fourth pivot axis, and a straight line passing through said first pivot axis and said third pivot axis intersects a straight line passing through said second pivot axis and said fourth pivot axis at a point located to one side of said track so as to permit the longitudinal center axis of each of said primary arm, said secondary arm, and said link to be located substantially parallel to said path along which said vehicle body is transported when said apparatus is in said stored position.

2. An apparatus for seizing and releasing a hinged member of a vehicle body and adapted to move from a first position wherein said apparatus seizes said hinged member while in a closed position to a second position wherein said apparatus holds said hinged member in an opened position while said vehicle body is transported along a path past said apparatus, said apparatus adapted to assume a stored position when not in use and comprising a carriage movable in either direction along a track located adjacent to and parallel to said path; a primary arm having one end thereof mounted on said carriage for pivotal movement about a first vertically orientated pivot axis; a secondary arm having an intermediate portion thereof connected to the other end of said primary arm for pivotal movement about a second vertically orientated pivot axis; a link having one end thereof pivotally connected to said carriage at a point spaced from said first pivot axis for pivotal movement about a third vertically orientated pivot axis, the other end of said link being connected to a portion of said secondary arm adjacent to said second pivot axis for pivotal movement about a fourth vertically orientated pivot axis; an article gripper mounted at the free end of said secondary arm; means carried by said secondary arm for selectively actuating said article gripper for causing said article gripper to seize or release said hinged member of said vehicle body; a motor connected to said primary arm for moving said primary arm and said secondary arm about said first pivot axis to said first position, said second position, and said stored position, the arrangement of said first, second, third, and fourth pivot axes and the relative lengths of said primary arm, said secondary arm, and said link being such that the path followed by a fixed point on said article gripper resulting from movement of said primary arm about said first pivot axis is substantially linear and substantially perpendicular to a line bisecting the angle included by said hinged member position in said first position and said second position, and a straight line passing through said first pivot axis and said third pivot axis intersects a straight line passing through said second pivot axis and said fourth pivot axis at a point located to one side of said track so as to permit the longitudinal center axis of each of said primary arm, said secondary arm, and said link to be located adjacent said carriage substantially parallel to said path along which said vehicle body is transported when said apparatus is in said stored position.

* * * * *